United States Patent
Delpoux et al.

(10) Patent No.: US 10,775,311 B2
(45) Date of Patent: Sep. 15, 2020

(54) SIMPLIFIED DEVICE FOR DETECTING THE FORMATION OF GAS HYDRATES

(71) Applicant: IFP Energies nouvelles, Rueil-Malmaison (FR)

(72) Inventors: Olivier Delpoux, Voiron (FR); Didier Frot, Saint Germain en Laye (FR); Anne Sinquin, Bezons (FR); Corinne Sagnard, Blyes (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/471,188

(22) PCT Filed: Nov. 30, 2017

(86) PCT No.: PCT/EP2017/080976
§ 371 (c)(1),
(2) Date: Jun. 19, 2019

(87) PCT Pub. No.: WO2018/114269
PCT Pub. Date: Jun. 28, 2018

(65) Prior Publication Data
US 2019/0391081 A1 Dec. 26, 2019

(30) Foreign Application Priority Data
Dec. 21, 2016 (FR) ..................... 16 62981

(51) Int. Cl.
*G01J 3/44* (2006.01)
*G01N 21/65* (2006.01)
*G01N 21/84* (2006.01)

(52) U.S. Cl.
CPC ..... *G01N 21/65* (2013.01); *G01N 2021/8411* (2013.01)

(58) Field of Classification Search
CPC ................. G01N 21/65; G01N 21/658; G01N 2021/656; G01J 3/44; G01J 3/02
USPC ......................................... 356/301
See application file for complete search history.

(56) References Cited

U.S. PATENT DOCUMENTS

| 8,325,338 B1 | 12/2012 | Pope et al. | |
| 2002/0134136 A1* | 9/2002 | Dalmazzone | G01K 17/00 73/25.01 |
| 2008/0003665 A1* | 1/2008 | Potyrailo | G01N 15/1459 435/287.2 |

(Continued)

FOREIGN PATENT DOCUMENTS

FR 2984504 A1 6/2013

OTHER PUBLICATIONS

International Search Report for PCT/EP2017/080976, dated Mar. 2, 2018, and English translation submitted herewith (7 pages).

(Continued)

*Primary Examiner* — MD M Rahman
(74) *Attorney, Agent, or Firm* — Fitch, Even, Tabin & Flannery, L.L.P.

(57) ABSTRACT

The device for detecting the presence of gas hydrates and/or ice according to the invention comprises at least:
 a laser source,
 at least two band-pass filters,
 at least one APD detector,
 at least one means for measuring the temperature at the measurement point, and
 means for analysing the presence or not of hydrates and/or ice at the measurement point.

9 Claims, 2 Drawing Sheets

(56) References Cited

U.S. PATENT DOCUMENTS

2011/0134421 A1* 6/2011 Baldwin .................. G01J 3/10
356/301

OTHER PUBLICATIONS

Reiko Kuriyama et al: "Two-wavelength Raman imaging for non-intrusive monitoring of transient temperature in microfluidic devices", Measurement Science and Technology, IOP, Bristol, GB, vol. 25, No. 9, Jul. 24, 2014 (Jul. 24, 2014), p. 95-203, XP020269346, ISSN: 0957-0233.
Xu Xue et al: "Detection of water-ice phase transition based on Raman spectrum", Journal of Raman Spectroscopy, vol. 44, No. 7, Jul. 24, 2013 (Jul. 24, 2013), pp. 1045-1048, XP055367175, GB ISSN: 0377-0486.
C.S.Garcia et al.: "Remote pulsed laser Raman spectroscopy system for detecting water, ice, and hydrous minerals", SPIE, PO Box 10 Bellingham WA 98227-0010 USA,vol. 6302, 2006, pp. 630215-1-630215-7, XP040228490.
Schicks J M et al: "Raman spectra of gas hydrates-differences and analogies to ice 1h and (gas saturated) water", Spectrochimica Acta. Part A: Molecular and Biomolecular Spectroscopy, Elsevier, Amsterdam, NL, vol. 61, No. 10, Aug. 1, 2005 (Aug. 1, 2005), pp. 2399-2403, XP027703263, ISSN: 1386-1425.
Written Opinion of International Searching Authority for PCT/EP2017/080976.

* cited by examiner

SIMPLIFIED DEVICE FOR DETECTING THE FORMATION OF GAS HYDRATES

CROSS-REFERENCE TO RELATED APPLICATIONS

This application is a U.S. national phase application filed under 35 U.S.C. § 371 of International Application No. PCT/EP2017/080976, filed Nov. 30, 2017, designating the United States, which claims priority from French Patent Application No.: 16/62.981, filed Dec. 21, 2016, the entire content of each of which are hereby incorporated herein by reference.

FIELD OF THE INVENTION

The present invention relates to the technical field of natural gas production and storage, and more generally to essentially gaseous fluids likely to form hydrate crystals or clathrates in a pipe.

The invention relates to a simplified device for implementing an optimized method allowing to detect the presence or the propensity for formation of hydrates of a gas or hydrates of a gas mixture in an essentially gaseous fluid.

BACKGROUND OF THE INVENTION

Cells for studying the capacity of a system consisting of liquid and gas to form gas hydrates are known. In laboratory installations, pilot and/or industrial plants, gas hydrate formation is detected either by a temperature increase because crystallization is exothermic, or, when the working device is respectively closed or semi-closed (allowing the pressure to be maintained), by a pressure drop or by a sudden gas consumption. It is also possible to detect hydrate formation by visual examination. It should be emphasized that, in most of these methods, it is necessary to form (or to dissociate) a large number of hydrate crystals to obtain a significant signal. In the case of gas systems with low water contents, equilibrium cells with water content measurement by gas chromatography or coulometry are used.

Gas hydrates are crystals comprised of a network of water molecules stabilized by hydrate formers (such as $CO_2$, $H_2S$, nitrogen, . . . ). Gas hydrates form under high pressure and low temperature conditions. If these crystals form, they grow, agglomerate and eventually clog pipes. Clogging remediation is long, difficult and dangerous. Currently, operators implement extensive and costly technical solutions to prevent formation of such crystals.

One object of the present invention is to provide a simplified device enabling early detection and measurement of gas hydrate formation, thus allowing implementation of effective remediation techniques for hydrate formation.

Raman spectrometry is a non-destructive and non-invasive technique for studying molecular bond vibrations that is currently commonly used for investigating the structure and the composition of natural or synthetic gas hydrates. Indeed, it is known that, in case of pure gas hydrates, Raman spectrometry allows to identify, through the vibration modes of the host molecules, the structure of the gas hydrate (of SI, SII or SH type) and to quantitatively determine the relative occupancies of the various cavity types of these different hydrate crystals. In the case of mixed hydrates (stabilized by a gas mixture), the technique allows to qualitatively identify the structure of the hydrate formed and the nature of the host molecules.

Raman spectrometry has already been used as a means of studying solid water formation.

The present invention is based on the fact that using Raman spectra in the vibration mode zone of the OH bonds of a water-containing medium likely to form solid crystals (such as ice and/or hydrates) allows, with the combination of a temperature measurement, to identify the presence or not of crystals by using a simplified measuring device.

SUMMARY OF THE INVENTION

The invention relates to a device for detecting the presence of gas hydrates and/or ice in a water-containing medium likely to form solid crystals. The device comprises at least:

- a laser source provided to irradiate at least one measurement point in said medium,
- at least two band-pass filters of predetermined characteristics for extracting the light intensities corresponding to the Raman spectra of two vibration modes of OH bonds, said filters being arranged on the signal reflected by said measurement point,
- at least one APD detector for recording the two signals filtered by said band-pass filters,
- at least one means for measuring the temperature at said measurement point, and
- means for analysing the presence or not of hydrates and/or ice at said measurement point, said analysis means exploiting two characteristic values of said filtered signals combined with said temperature measurement to determine the presence or not of hydrates and/or ice.

According to an embodiment of the invention, the detection device comprises an optical switch provided to alternately lead said filtered signals to a single APD detector.

According to an implementation of the invention, said two band-pass filters are determined to extract the light intensities corresponding to the Raman spectra of two vibration modes of the OH bonds having respectively wavenumbers at $3160\ cm^{-1} \pm 40\ cm^{-1}$ and $3400\ cm^{-1} \pm 150\ cm^{-1}$.

According to a feature, said characteristic value corresponds to the intensity of the signals, or to a value directly related to the intensity, for example the integral of said spectrum centered on said vibration modes.

According to an embodiment option, said analysis means calculate a ratio r of said two characteristic values.

Advantageously, said filters are two band-pass filters centered around 640 nm and 650 nm, so as to correspond to the Raman signals of said two vibration modes of the OH bonds.

Advantageously, said device comprises means for adjusting the temperature in the vicinity of said measurement point.

Furthermore, the invention relates to a use of the device according to one of the above characteristics for detecting the presence of hydrates and/or ice in a production effluent resulting from the exploitation of hydrocarbons, where a step of calibrating said device from a sample representative of said effluent is carried out.

Advantageously, this calibration determines, for at least one temperature, a reference ratio $T_0$ for detecting the presence or not of solid ice or hydrate crystals.

Preferably, the presence of hydrate crystals is deduced if ratio $\tau$ of said characteristic values of said filtered signals is greater than a calibration value $\tau_0$ and if the measured temperature is higher than the ice formation temperature Tf under the measurement conditions.

BRIEF DESCRIPTION OF THE FIGURES

Other features and advantages of the present invention will be clear from reading the description hereafter of embodiments given by way of non-limitative examples, with reference to the accompanying figures wherein.

DETAILED DESCRIPTION OF THE INVENTION

Figure 1A:
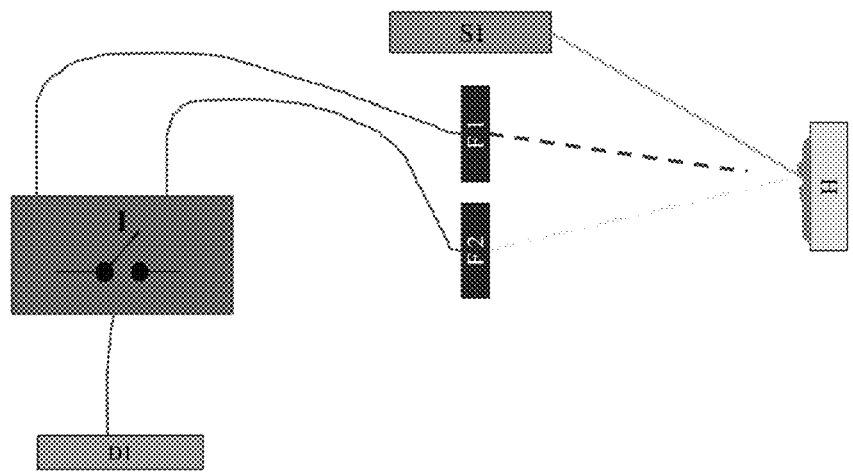
FIGS. 1a and 1b show two embodiments of the device according to the invention.

The present invention can be described as a device suited for implementing a method of detecting gas hydrates and/or ice, based on information obtained from Raman spectra and a temperature measurement (using a temperature sensor for example).

The device for detecting the presence of gas hydrates and/or ice according to the invention comprises at least:
- a laser source provided to irradiate at least one measurement point in a water-containing medium likely to form solid crystals (gas hydrates and/or ice),
- at least two band-pass filters of predetermined optical characteristics for extracting the light intensities corresponding to the Raman spectra of two vibration modes of OH bonds, said filters being arranged on the signal reflected by the measurement point (in other words, the laser source emits a signal irradiating the measurement point, this signal is reflected by the measurement point and this reflected signal passes through the band-pass filters),
- at least one APD (Avalanche PhotoDiode) detector for recording the two signals filtered by the two band-pass filters (in other words, the filtered signals are sent to the APD detector(s)),
- at least one means for measuring the temperature in the vicinity of the measurement point, and
- means for analysing the presence or not of hydrates and/or ice at the measurement point, said analysis means exploiting two characteristic values of the filtered signals (filtered by the band-pass filters) combined with the temperature measurement to determine the presence or not of hydrates and/or ice (solid crystals).

The device according to the invention can be considered as a "simplified Raman spectrometer" in that it provides no Raman spectra, but information or measurements that are exploited in a hydrate detection method, as if obtained from Raman spectrometry. Indeed, it has been observed that, regarding solid ice or hydrate crystals detection, only two modes can be considered in the spectral range of the OH bond vibrations: the vibration mode of solid water (hydrate or ice) and the vibration mode of free water.

The invention thus provides a device giving at least one "characteristic value" for each of these two modes. By means of these two characteristic values combined with a temperature measurement, the analysis means deduce the presence or not of solid ice or hydrate crystals. A "characteristic value" is understood to be the signal intensity, or a value directly related to the intensity, for example the integral of said spectrum centered on said vibration modes.

It is reminded that Raman spectrometry is an optical method of observing and characterizing the molecular composition and the external structure of a material. Raman spectrometry exploits the physical phenomenon according to which a medium slightly modifies the frequency of the light circulating therein. Raman spectroscopy consists in sending a monochromatic light onto the sample and in analysing the scattered light. The information obtained by measuring and analysing this shift makes it possible to trace certain properties of the medium, by spectroscopy.

Selection of the laser source and of the APD detector is conditioned by the search for optimum conditions in terms of signal-to-noise ratio in the spectral range of the vibration modes of OH bonds. Selection of the two band-pass filters is also conditioned by the choice of the excitation length in order to recover the Raman scattering intensities corresponding to two vibration modes that can correspond to wavenumbers at $3160$ cm$^{-1}\pm 40$ cm$^{-1}$ and $3400$ cm$^{-1}\pm 150$ cm$^{-1}$.

An APD (avalanche photodiode) detector is an electronic component similar to photomultipliers that exploits the photoelectric effect to convert light to electricity. APD detectors are used for detecting extremely low light intensities.

Near to the measurement point (also referred to as analysis point) where the laser irradiates the sample, a temperature sensor (a thermocouple for example, or a third optical fiber coupled to an offset measuring means, or any other temperature measuring means) can be installed so as to simultaneously have, for the sample zone, the Raman scattering and the temperature thereof.

Each measurement point is associated with a temperature measurement in the vicinity of said measurement point, allowing to measure the temperature of the fluid circulating in said vicinity of the measurement point.

According to an embodiment of the invention, the device according to the invention can comprise two APD detectors. Each APD detector is arranged at the output of a band-pass filter so as to record the two filtered signals separately and simultaneously.

Alternatively, the detection device can comprise a single APD detector for measuring the two signals from the two band-pass filters. For this embodiment, the detection device can further comprise an optical switch arranged between the two filters and the APD detector. The switch allows to alternately transfer a single signal to the APD detector.

According to an embodiment of the invention, both data (Raman spectra and temperature) can be sent to analysis means, notably computer means (a PC for example) controlling the analytical chain, for exploitation of these measurements.

A mathematical spectral decomposition method can then be implemented in order to evaluate, after baseline subtraction (a method known to the person skilled in the art), a characteristic value for each of the following two vibration modes of the OH bonds (also referred to as water vibration modes):
- a first water vibration mode (referred to as mode A hereafter), such as that with a wavenumber at $3160$ cm$^{-1}\pm 40$ cm$^{-1}$, and
- a second water vibration mode (referred to as mode B hereafter), such as that with a wavenumber at $3400$ cm$^{-1}\pm 150$ cm$^{-1}$.

According to an implementation of the invention, the two band-pass filters are determined to extract the light intensities corresponding to the Raman spectra of these two vibration modes of the OH bonds (a wavenumber at 3160 $cm^{-1} \pm 40\ cm^{-1}$ and a wavenumber at $3400\ cm^{-1} \pm 150\ cm^{-1}$).

Advantageously, the two filters can be band-pass filters substantially centered around 640 nm and 650 nm, so as to correspond to the Raman signals of the two vibration modes of the OH bonds.

A "characteristic value" is understood to be the intensity of the signal or a value directly related to the intensity, for example the area (obtained by integration of the spectrum on bands corresponding to the two water vibration modes).

The position of the bands corresponding to vibrations modes A and B can be given in wavenumber ($cm^{-1}$) or in wavelength (nm). It is reminded that the wavenumber is a quantity inversely proportional to the wavelength. This position is always given in relative terms (Raman shift) in relation to the position of the incident laser (the position of the bands expressed in wavelength depends on the wavelength of the incident laser of the Raman spectroscope).

According to an embodiment of the invention, once the two characteristic values determined, the analysis means calculate a ratio $\tau$ of these two characteristic values. Preferably, the ratio corresponds to the ratio of the first water vibration mode (mode A) to the second water vibration mode (mode B).

According to an implementation of this embodiment, ratio $\tau$ can then be compared, by the analysis means, with limit values $\tau_0$ previously determined by calibration in the medium considered. Limit values $\tau_0$ can depend on the medium, the temperature, the pressure, etc. Ratio $\tau_0$ can depend on the temperature, hence the interest of using a temperature measurement coupled with the Raman measurement. If $\tau > \tau_0$, then the system contains water in solid form (hydrates or ice). If $\tau < \tau_0$, then the system contains no water in solid form (hydrates or ice). Furthermore, when $\tau > \tau_0$, if temperature T measured in the vicinity of said measurement point is higher than ice formation temperature Tf under the measurement conditions, the analysis means can distinguish between a presence of ice or a presence of gas hydrates: if $\tau > \tau_0$ and T>Tf, then the analysis means can highlight the presence of gas hydrates.

Temperature Tf notably depends on the water-containing medium and on the pressure. In particular, temperature Tf can be higher in the presence of an additive.

According to an example embodiment of the invention, ratio $\tau_0$ can range between 0.8 and 1.2 for detection of the formation of solid water, ice or hydrates in a methane-containing medium.

The calibration operation is possibly carried out at different temperatures, under conditions representative of industrial operations of the water-containing medium.

In short, from the calibration procedure, the on-line measurement of the water vibration modes using a simplified device and of temperature T in the vicinity of the measurement point, the analysis means determine a limit value allowing to decide on the formation or not of water in solid form, notably in gas hydrate form.

According to an implementation of the invention, means for adjusting the temperature of the medium at the measurement point can be added, so as to be able to control the temperature of the medium (by imposing a temperature range at the measurement point) in order to anticipate the formation of hydrates, or more generally of water in solid form. Preferably, the temperature adjustment means decrease the temperature of the medium in the vicinity of the measurement point.

According to an embodiment of the invention, if the analysis means detect the formation of hydrates and/or ice at the measurement point after cooling of the medium at the measurement point, it is possible to prevent hydrate formation in the medium by injecting an anti-hydrate additive into the water-containing medium. It is thus possible to anticipate hydrate prevention in the water-containing medium.

Figure 1B:
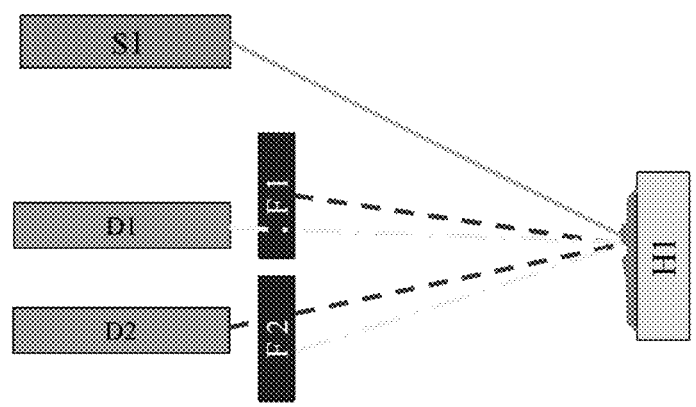

FIGS. 1a and 1b schematically illustrate, by way of non-limitative example, two detection devices according to the invention. The temperature measuring means and the analysis means are not shown in these figures.

FIG. 1a schematically shows an implementation of the device where a laser source (S1) irradiates a measurement point (H) that sends back a signal filtered by two optical band-pass filters (F1 and F2), the two filtered signals being recorded by a single APD detector alternately by means of a switch (I).

FIG. 1b schematically shows a second implementation of the device where a laser source (S1) irradiates a measurement point (H) that sends back a signal filtered by two optical band-pass filters (F1 and F2), the two filtered signals being recorded each by an APD detector (D1 and D2).

Furthermore, the invention relates to a method for detecting gas hydrates and/or ice using the device according to the invention, which can comprise the following steps:
sending at least to one point of the medium a laser light signal whose wavelength is below 785 nm (provided by the laser source),
collecting the light intensities corresponding to vibration modes A and B at the point considered by means of two band-pass filters and of one or more APD detectors,
processing the signals according to the method described above (by measuring the characteristic values for the two OH bond vibration modes), using the analysis means,
collecting at the end of this processing the value of the ratio of intensity or of the areas $\tau$, using the analysis means,
measuring temperature T in the vicinity of the measurement point,
comparing the value of ratio $\tau$ with a reference value $\tau_0$, using the analysis means,
according to the difference between measured value $\tau$ and reference value $\tau_0$, and according to the measured temperature, we decide on the presence or not of solid ice or hydrate crystals, using the analysis means.

According to this information, it is possible to act on at least one action variable, for example temperature, pressure, additive injection or fluid flow rate, in order to prevent hydrate (or ice) formation in the water-containing medium.

In a variant, temperature T in the vicinity of the measurement point is controlled.

Temperature adjustment means intended to cool said measurement point can be added. The method then allows to anticipate a hydrate formation temperature under real conditions.

EXAMPLE

Other features and advantages of the method according to the invention will be clear from reading the application example hereafter. In this example, the medium consists of methane in gas phase at a pressure of 70 bars and a small amount of water in an enclosure containing a temperature sensor and the device according to one of FIG. 1a or 1b, with a laser source having an excitation wavelength at 532 nm (or 18,797 $cm^-$). The filters selected are two band-pass filters centered at 640 nm (or 15,625 cm$^{-1}$) and 650 nm (or 15,385 cm$^-$) in order to respectively extract the light intensities or the areas corresponding to the Raman signals at 3412 cm$^{-1}$ (18,797-15,385) and 3172 cm$^{-1}$ (18,797-15,625).

Figure 2:
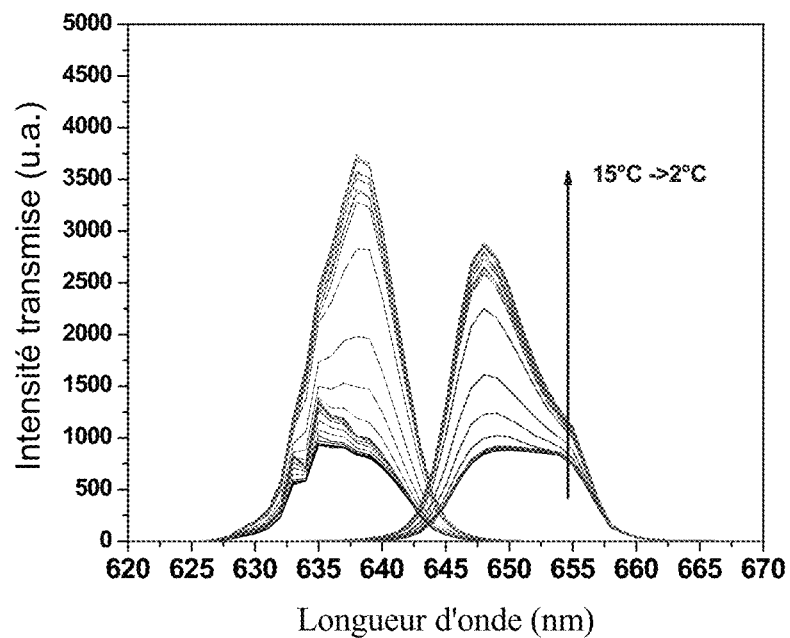
FIG. 2 shows spectra as a function of the temperature of the medium considered, obtained with the device according to an embodiment of the invention.

The light intensities illustrated in FIG. 2 were recorded upon cooling the enclosure between 15° C. and 2° C. Each curve corresponds to a temperature of the enclosure.

In this example, the characteristic values considered are the integrals of said spectra centered on said vibration modes.

Figure 3:
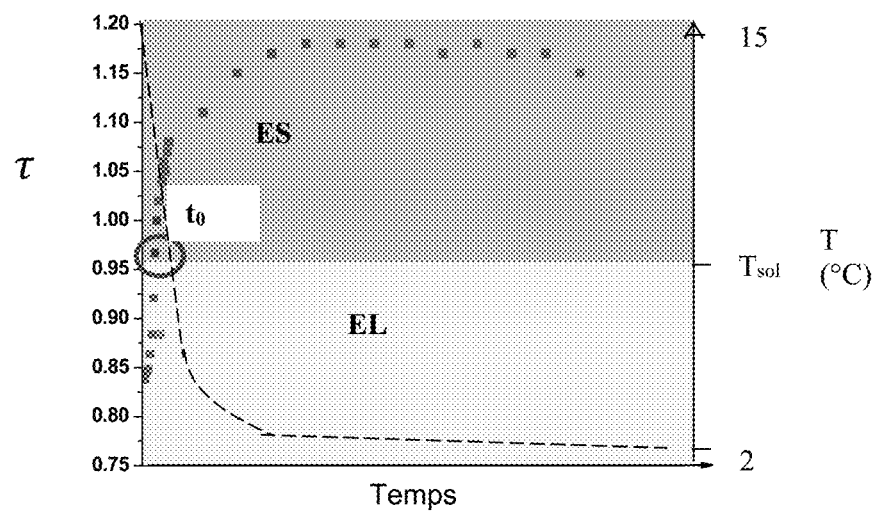
FIG. 3 shows the evolution of ratio r of the areas of the signals of two different vibration modes of the OH bonds.

The integrated areas of the two clusters centered at 640 nm and 650 nm collected by the two APD detectors are measured. The analysis means then calculate ratio τ of the two areas (A(640)/A(650)) as a function of time (FIG. 3) or indifferently as a function of temperature since the temperature is lowered over time in this test. In FIG. 3, intensity ratio τ is represented by grey squares and the variation of temperature T in ° C. is illustrated by the dotted curve. The comparison of the values of ratio τ, ranging here between about 0.8 and 1.2, with a reference value $\tau_0$ set here at 1 after prior calibration, allows to decide on the presence of water in solid form. In the region τ<$\tau_0$ (region EL in FIG. 3), the system contains no water in solid form. In the region τ<$\tau_0$ (region ES in FIG. 3), the system contains water in solid form. The time corresponding to the transition from one region to another, i.e. corresponding to the time when solid crystals form, is denoted by $t_{sol}$. The measurement of temperature T in the vicinity of the Raman spectra measurement point allows to convert this time $t_{sol}$ to a temperature $T_{sol}$ of solid particles appearance. In this example, the temperature ranges between 15° C. and 2° C., and temperature $T_{sol}$ of solid particles appearance is higher than the ice formation temperature, which additionally allows to conclude on the appearance of crystals of gas hydrate type rather than of ice type.

The invention claimed is:

1. A device for detecting the presence of gas hydrates and/or ice in a water-containing medium likely to form solid crystals, the device comprising:
    a laser source provided to irradiate at least one measurement point in the medium,
    at least two band-pass filters of predetermined characteristics for extracting light intensities corresponding to Raman spectra of two vibration modes of OH bonds, a first mode of the two vibration modes having a wavenumber at 3160 cm$^{-1}$±40 cm$^{-1}$ and a second mode of the two vibration modes having a wavenumber at 3400 cm$^{-1}$±150 cm$^{-1}$, the at least two band-pass filters being arranged on a signal reflected by the at least one measurement point,
    at least one APD (Avalanche PhotoDiode) detector for recording two signals filtered by the at least two band-pass filters, at least one temperature sensor configured to obtain a temperature measurement at the at least one measurement point, and
    a computer for analysing the presence of gas hydrates and/or ice at the at least one measurement point, the computer exploiting two characteristic values of the two signals filtered by the at least two band-pass filters combined with the temperature measurement to determine the presence of gas hydrates and/or ice, the computer being configured to perform a process comprising:
        calculating a ratio τ of the two characteristic values;
        determining whether gas hydrates and/or ice are present by comparing the ratio τ with limit values $\tau_0$ previously determined by calibration in the medium; and
        distinguishing between the presence of gas hydrates and ice by comparing a temperature measured at the measurement point with an ice formation temperature.

2. The device as claimed in claim 1, further comprising an optical switch provided to alternately lead the two signals filtered by the at least two band-pass filters to a single APD detector.

3. The device as claimed in claim 1, wherein the two characteristic values correspond to the intensities of the two signals filtered by the at least two band-pass filters, or to values directly related to the intensities of the signals filtered by the at least two band-pass filters.

4. The device as claimed in claim 3, wherein the two characteristic values correspond to integrals of spectra centered on the two vibrational modes of OH bonds.

5. The device as claimed in claim 1, wherein the at least two band-pass filters are centered around 640 nm and 650 nm, so as to correspond to the Raman signals of the two vibration modes of the OH bonds.

6. The device as claimed in claim 1, further comprising means for adjusting the temperature in the vicinity of the measurement point.

7. A method of detecting the presence of gas hydrates and/or ice in a production effluent resulting from exploitation of hydrocarbons, the method comprising: calibrating the device as claimed in claim 1 from a sample representative of the effluent.

8. The method as claimed in claim 7, wherein the calibrating determines, for at least one temperature, the limit values $\tau_0$.

9. The method as claimed in claim 8, further comprising:
    determining whether gas hydrates and/or ice are present by comparing the ratio τ with the limit values $\tau_0$, gas hydrates and/or ice being present when the ratio τ is greater than the limit values $\tau_0$, and
    distinguishing between the presence of gas hydrates and ice by obtaining a temperature measurement and comparing the temperature measurement with an ice formation temperature Tf, gas hydrates being present when the temperature measurement is higher than the ice formation temperature Tf under the measurement conditions.

* * * * *